(No Model.)  
6 Sheets—Sheet 1.

T. B. PHELPS.
CAN SOLDERING MACHINE.

No. 592,663.  
Patented Oct. 26, 1897.

Fig. 1.

WITNESSES:  
William P. Goebel  
J. Fred Acker

INVENTOR  
T. B. Phelps  
BY Munn  
ATTORNEYS.

(No Model.)  6 Sheets—Sheet 4.

T. B. PHELPS.
CAN SOLDERING MACHINE.

No. 592,663.  Patented Oct. 26, 1897.

WITNESSES.
William P. Goebel.
J. Fred Acker.

INVENTOR
T. B. Phelps
BY
ATTORNEYS.

(No Model.)  6 Sheets—Sheet 5.

T. B. PHELPS.
CAN SOLDERING MACHINE.

No. 592,663. Patented Oct. 26, 1897.

WITNESSES:
William P. Goebel
Fred Acker

INVENTOR
BY T. B. Phelps
ATTORNEYS.

(No Model.) 6 Sheets—Sheet 6.

T. B. PHELPS.
CAN SOLDERING MACHINE.

No. 592,663. Patented Oct. 26, 1897.

WITNESSES:
William P. Goebel
J. Fred Acker

INVENTOR
T. B. Phelps
BY
Munn
ATTORNEYS.

UNITED STATES PATENT OFFICE.

THEODORE B. PHELPS, OF BREWSTER, NEW YORK.

CAN-SOLDERING MACHINE.

SPECIFICATION forming part of Letters Patent No. 592,663, dated October 26, 1897.

Application filed September 14, 1896. Serial No. 605,751. (No model.)

*To all whom it may concern:*

Be it known that I, THEODORE B. PHELPS, of Brewster, in the county of Putnam and State of New York, have invented a new and Improved Can-Soldering Machine, of which the following is a full, clear, and exact description.

My invention relates to a machine especially adapted for soldering can-bodies; and the object of the invention is to construct such a machine in a simple, durable, and economic manner and to provide for the automatic soldering of the overlapping edges of the body, automatically holding the can in position to be soldered, and automatically discharging the soldered body from the mandrel on which it is carried.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Fig. 4 is a view similar to that shown in Fig. 3, the soldering-iron being illustrated as in position on the can and at the commencement of its work of soldering, dotted lines being drawn to indicate the advance movement of the soldering-iron in a horizontal direction and the position of the cams actuating the said iron when the iron is at its outermost point of travel. Fig. 7 is a horizontal section taken substantially on the line 7 7 of Fig. 5.

Figure 10:
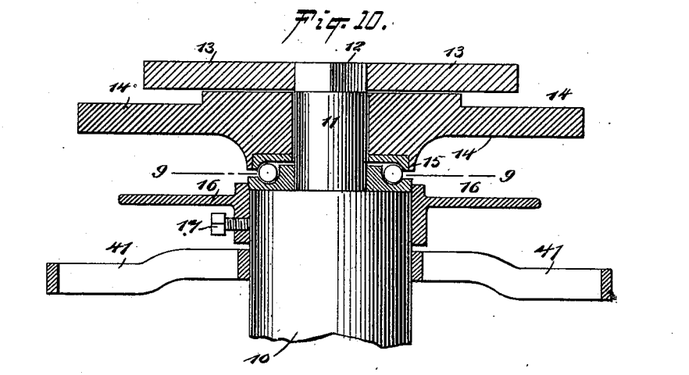
Fig. 10 is a vertical section on the line 10 10 of Fig. 9, illustrating in sectional view the two tables, the main cams, which are below the table, and the bearings for the rotating table.

In carrying out the invention a support 10 is provided, which is to be stationary, and the said support is reduced at its upper end to form a post 11, circular in cross-section and terminating in a polygonal section 12. The polygonal section 12 receives a table 13, which is a fixed table and is adapted to carry the gearing of the machine, and below the fixed table a second and larger table 14 is located, the upper and the lower tables being preferably of circular formation, although they may be given other shapes. The revolving table 14 is provided with ball-bearings 15, which in part are supported by the upper enlarged portion of the main support 10, as shown in Fig. 10.

Figure 9:
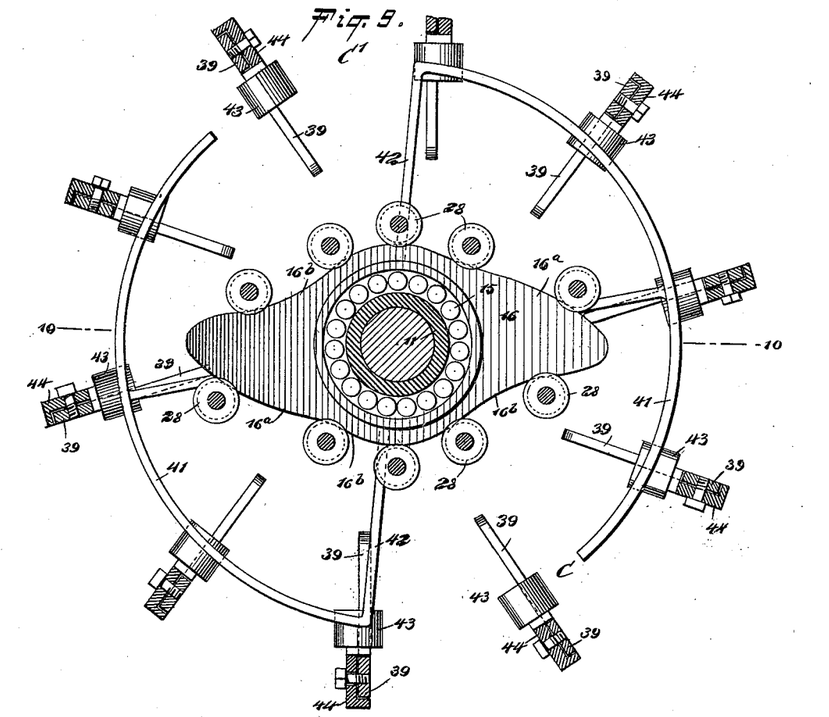
Fig. 9 is a horizontal section taken substantially on the line 9 9 of Fig. 10.

Below the revolving table 14 a cam 16 is secured upon the said main support by means of a set-screw 17 or its equivalent, and this cam consists of two opposing leaves which approach a right-angular shape and are integral with a circular body, the latter being that which is clamped to the support 10, the cam being shown in plan view in Fig. 9. The leaves of the cam have their side edges curved or undulating, so as to present the concaved portions 16$^b$ and convexed portions 16$^a$, as is also fully shown in Fig. 9.

Figure 1:
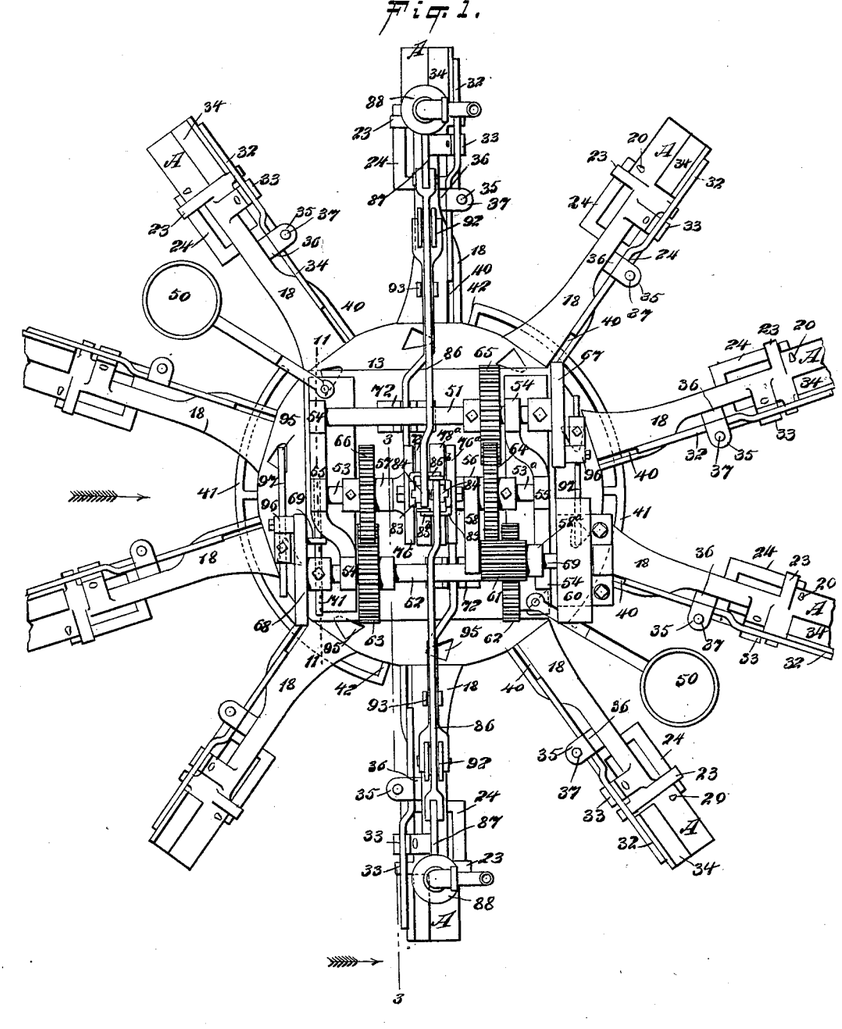
Figure 1 is a plan view of the improved machine.
Figure 3:
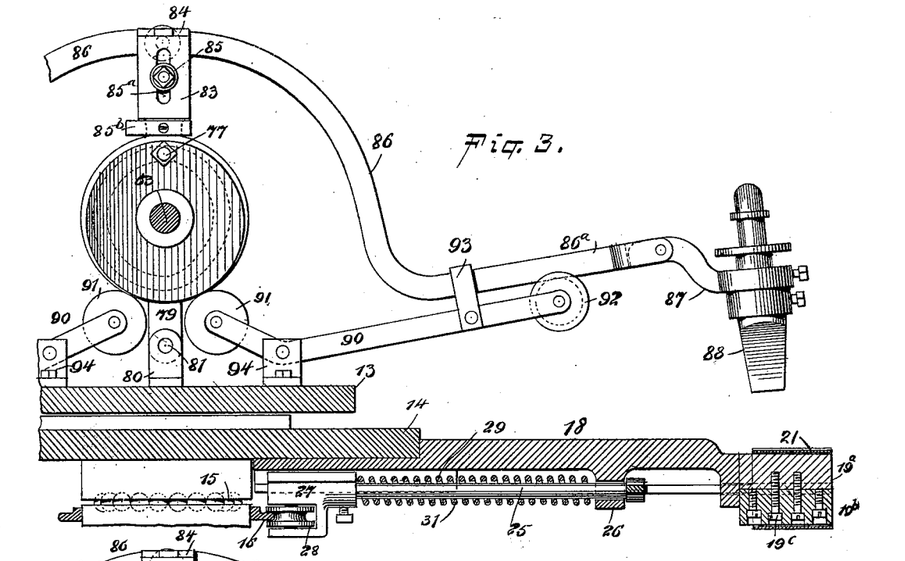
Fig. 3 is a vertical section through a portion of the machine, the section being taken practically on the line 3 3 of Fig. 1, the said view illustrating particularly the manner in which the soldering-iron is raised and given lateral movement.
Figure 8:
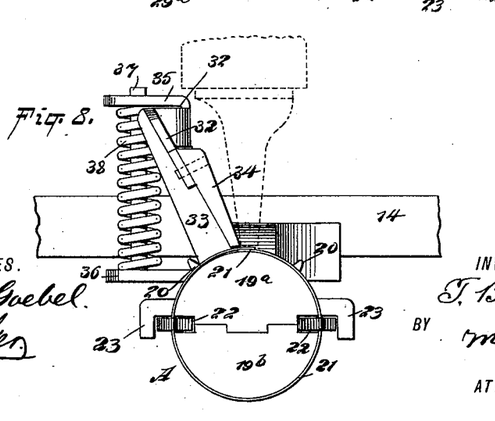
Fig. 8 is an end view of the mandrel on which the can-body is placed, together with an end view of the end carrying the mandrel and the clamp for the can.

Any desired number of arms 18 is secured to the revolving table 14. Ordinarily, however, the arms are ten in number, as illustrated in Fig. 1, being radially disposed. Each arm is provided at its outer end with a mandrel A, and this mandrel is circular in cross-section and is preferably made in two sections, as shown in Figs. 3 and 8, the sections being vertically adjustable to and from each other, one section being designated as 19$^a$ and the other section as 19$^b$, while adjusting-screws 19$^c$, or whatever equivalent that may be employed, are preferably carried through the bottom section of the mandrels and into the upper sections, as shown particularly in Fig. 3. Each mandrel has stops 20, which are in the nature of pins, secured upon its upper section, one at each side of the center, as illustrated, and each mandrel is adapted to receive a can-body 21, the opposing edges of the can-body being overlapped a predetermined distance, so as to produce a seam of desired width. The adjustment of the mandrel is to provide for the reception of can-bodies of different diameters, if desired.

Figure 5:
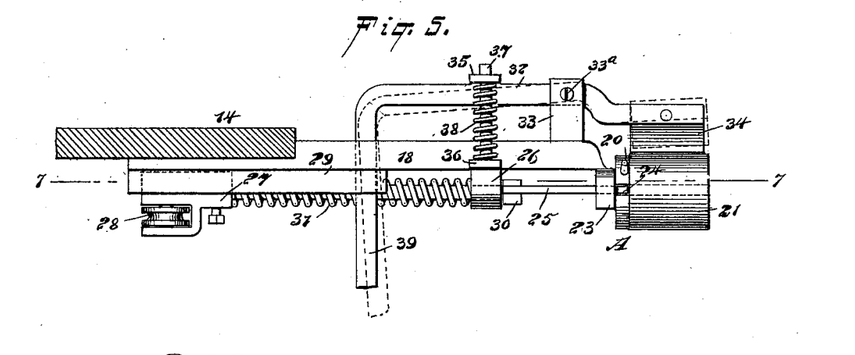
Fig. 5 is a side elevation of an arm and can-carrying mandrel attached, together with a side elevation of the clamp adapted to hold the can-body in position on the mandrel.

In the opposing faces of the sections of each mandrel at the outer sides, registering longitudinally and horizontally, slots 22 are produced, and guide-fingers 23 are formed integral with the arms 18 and extend outward beyond the recessed portions of the mandrels at their inner ends, as shown especially in Figs. 5 and 8. A shifting-fork 24 is provided for each can-body-receiving mandrel, and the members of the said forks have sliding movement in recesses 22 in the mandrels, being preserved from lateral movement by the guide-fingers 23. The outer ends of the members of the forks are adapted to engage with the inner edge of the can-body after the said body has been soldered and to act to force the can-body from off the supporting-mandrel. Each fork 24 is attached to a rod 25, and the rods are led inward beneath the revolving table 14, and each rod is secured to a sliding block 27, provided at its bottom with a pulley 28. Each block 27 has lateral movement in guideways 29, which are attached to the bottom of the revolving table 14 and also to the bottom portions of the arms 18. One of the said slideways 29 is bifurcated at its outer end, as shown at 29$^a$ in Fig. 7.

Each of the rods 25, connected with the shifting-forks, is provided with a bearing 26, attached to the upper face of an arm 18 near its outer end, and each shifting-rod 25 is encircled by a spring 31, which has bearing against the sliding block 27, attached to the shifting-rod and against the forward bearing 26. When the pulleys 28, which are peripherally grooved and are adapted to engage with the fixed cam 16, are brought to a depression in the leaves of the said cam, the springs 31 will draw the shifting-forks inward and will maintain them in the inward position as long as the concaved surfaces 16$^b$ of the cam are in contact with the said rollers 28, the inward movement of the rod being limited by a hub 30, formed on the forks 24, engaging with the outer face of the bearings 26. When, however, the rollers 28 engage with the convexed surfaces of the cam-leaves, the forks 24 will be forced outward and will act to remove the can-body after it has been soldered from the mandrels, in connection with which the said shifting-forks act. The removal of the can-bodies from the mandrels is graduated or timed and is regulated by the rise of the convexed surfaces 16$^a$ from the concaved surfaces 16$^b$ of the aforesaid cam 16.

It is necessary that the can-body should be held on the mandrel while the soldering operation is being carried on, and to that end each arm 18 is provided with a standard 33, which is preferably inclined beyond one side of the arm, the standard being located near the outer end of the arm, and upon the upper portion of the standard a clamping-lever 32 is fulcrumed, the fulcrum being shown at 33$^a$ in Fig. 5. The outer end of the clamping-lever is bent downward and carried over the mandrel and has attached to it a head 34, as shown in Fig. 8, which head is adapted to engage with the outer face of the can-body at one side of its overlapping edges, the said overlapping edges being at the top portion of the mandrel.

Figure 6:
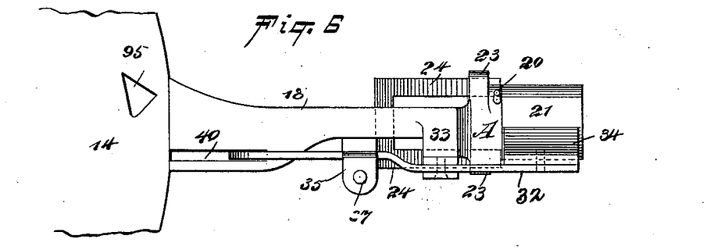
Fig. 6 is a plan view of the arm, the clamp, and the mandrel on which the can-body is placed shown in Fig. 5.
Figure 7:
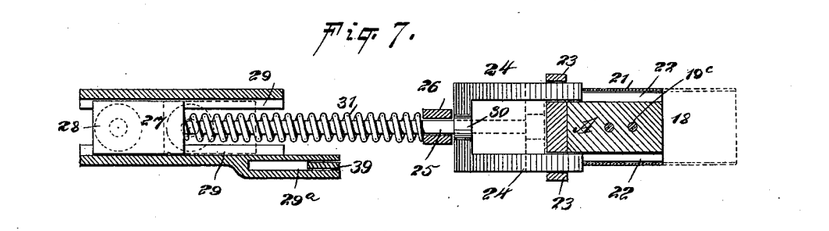

A bracket 35 is projected from the top portion of each clamping-arm beyond the side in direction of which the support 33 inclines, and each of these brackets is directly over brackets 36, secured upon and projecting from the sides of the arms 18, as illustrated in Figs. 5 and 8. A rod 37 is secured to the lower bracket, being passed loosely through the upper bracket 35, and upon the rod 37 of each can-carrying arm a spring 38 is coiled, having bearing against two brackets, and since the brackets are at the inner side of the pivotal points of the clamping-arms the tendency of the springs 38 will be to force the clamping-heads 34 to a firm contact with the can-bodies on the mandrels of the arms to which the clamps are applied. Each clamping-arm is provided with a vertical rear member 39, and these vertical rear members extend downward through slots 40, made in the arms 18, as shown in Fig. 6, and likewise through the space between the bifurcated ends 29$^a$ of the slideways 29, attached to the said arms, as shown in Fig. 7.

A cam 41, made in two sections, is located beneath the leaf-cam 16, and this lower cam 41 is in the main circular and is permanently attached to the support 10. The cam is divided at the right of the center at the front of the machine and at the left of the center at the rear of the machine, the spaces caused by the division being designated the one in the front as C and the one at the rear as C'.

Figure 2:
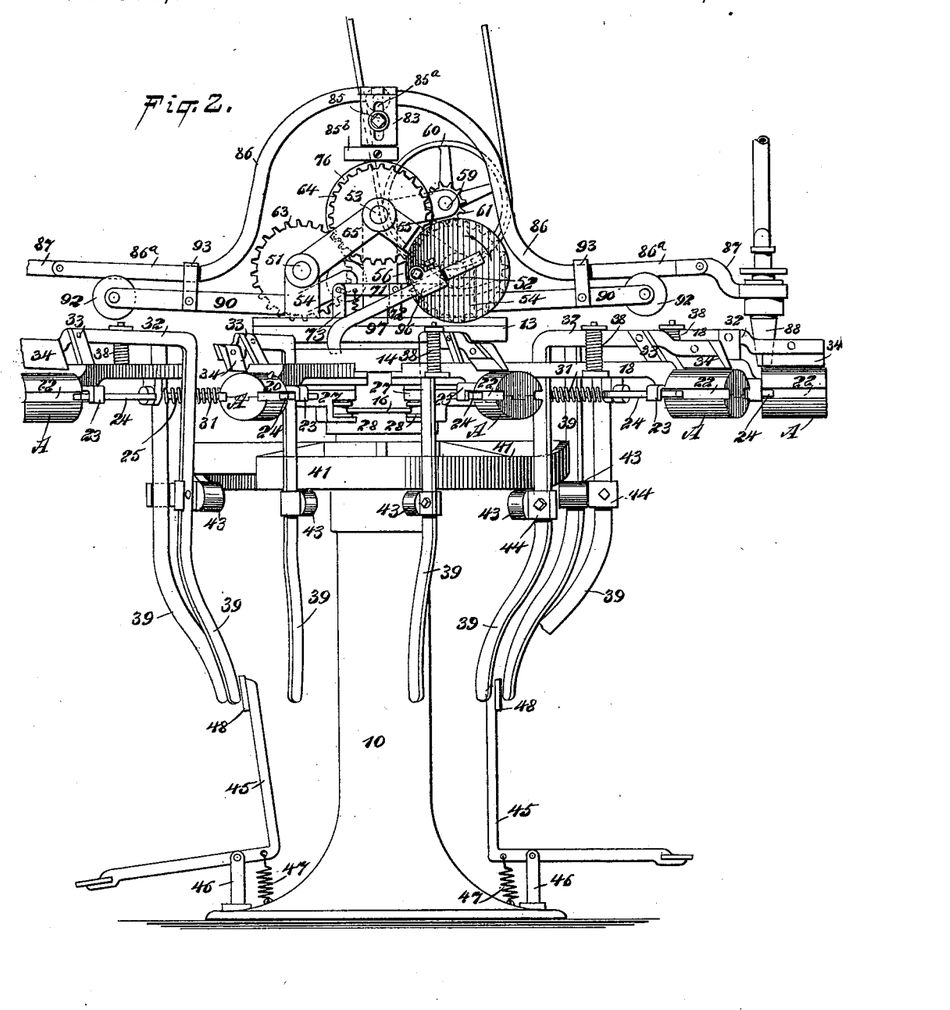
Fig. 2 is a side elevation, the machine being viewed from the direction indicated by the large arrow in Fig. 1.

At the commencement of the left-hand section of the cam, which is at the front of the machine, and the commencement of the right-hand section of the cam 41, which is at the rear of the machine, the under surface of the cam is elevated, the remaining portion of the under surface of the cam being practically straight, and at the lower end of the vertical portion of each clamping-lever a friction-pulley 43 is attached, preferably through the medium of a sleeve 44, which may be adjustable, as shown in Fig. 2, and these friction-rollers travel upon the undulating under edges of the aforesaid cams 41, as illustrated in Fig. 2, and when the friction-rollers of the levers engage the higher or upwardly-inclined portions of the cam-sections the springs 38 of the clamping-levers act to force the heads 32 of the said levers downward against the can-body, holding them in such position; but when the friction-rollers engage with the straight or lower faces of the track-faces of the cam-sections the inner ends of the clamping-levers are drawn downward, so that the clamping-heads of the levers are removed from the can-bodies, admitting of the said can-bodies being removed from their sustaining - mandrels. Therefore it is obvious that the change in the track-surfaces of the cam-sections 41 must correspond to the change in the surfaces of the leaves of the upper fixed cam 16, the friction-rollers 28 on the shifting-arms engaging with the depressed portions of the leaf-cam when the friction-rollers 43 on the clamping-levers engage with the upper or elevated surfaces of the track-faces of the circular sectional cam 41, the friction-rollers of the shifting-arms engaging with the convexed surfaces 16ª of the leaf-cam when the clamping-levers 39 are carried downward by contact with the straight lower faces of the track-surfaces of the sectional cam, thereby elevating the clamps and permitting the shifting-arms and their forks to remove the can-bodies gradually from their supporting-mandrels, and this removal of the can-bodies is done step by step, since the can-bodies are placed upon the mandrels when the mandrels are opposite the spaces C and C' between the sections of the lower or circular sectional cam 41, and the complete removal of the can-bodies is effected just before the mandrels reach the aforesaid openings. At these openings—front and rear—receptacles 50 are located, and the attendants or operators are so placed that the said operators may take from the said receptacles pellets of solder and resin, which are placed on the can-bodies over the seam at the inner ends of said bodies, the soldering-pellets being thus placed upon the can-bodies immediately after the said bodies are about in position on the mandrels.

When the arms 18, carrying the mandrels, reach the open spaces C and C' between the sections of the lower or circular cam, the clamping-arms will be in firm engagement with the can-bodies. It is therefore necessary that these clamping arms or levers should be raised to permit the can-bodies to be placed on the mandrels, and that immediately after the can-bodies are so placed the clamping-levers shall again act upon the can-bodies to hold them in position. This is accomplished by locating at the front and rear portions of the machine and at the central portion of the openings C and C' above referred to foot-levers 45, which are preferably of angular construction, the said levers being mounted upon suitable supports 46, and their upper or vertical members being held out of the path of the lower ends of the clamping-levers by springs 47, as shown in Fig. 2. By placing the foot upon one of these levers 45 when a mandrel-carrying arm is in position to receive a can-body the vertical member of the lever will be carried outward, and a plate 48 at its top will engage with the lower end of the clamping-lever of said arm, and the clamping-head of the said lever will be raised from the can. As soon as the can is placed in position the lever is released and the clamping-head will return to an engagement with the can-body, and at that time the soldering-pellet is placed on the seam of the can-body.

On the stationary table 13 two shafts 51 and 52 are journaled, extending from side to side of said table, one near the front and the other near the back, and between these two shafts and parallel therewith a divided shaft is journaled, the sections whereof are designated as 53 and 53ª. The front and rear shafts are journaled at or near their ends in bearings 54, and from the said bearings arms 55 are carried in direction of a central point between the shafts 51 and 52, as shown in Fig. 2, these arms being located at each side of the said fixed table, and in bearings located at the junction of these arms 55 the outer ends of the short shafts 53 and 53ª are journaled, their inner ends being journaled in suitable upright bearings 56 and 57, (shown in Figs. 1 and 2,) and from the bearing 56 an arm 58 is carried in an upwardly and forwardly direction, the said arm journaling one end of a driving-shaft 59, the other end being journaled in an upright bearing 58ª, as shown in Fig. 1. A driving-pulley 60 is secured upon the outer end of the shaft 59, and a pinion 61 is secured upon the inner portion of this drive-shaft, which pinion is sufficiently wide to mesh with a gear 62 on the right-hand end of the shaft 52 and a gear 64, secured on the central short shaft 53ª, this latter gear 64 in its turn meshing with a gear 65, which is secured upon the rear shaft 51. The forward or front shaft 52 is provided with a second gear 63, which meshes with a gear 66 on the left-hand central shaft 53. These gears are preferably on the scale of ten to one, since ten mandrel-carrying arms are carried by the machine, and the rotating table makes one-tenth of a revolution at each movement, a stoppage following each movement.

Figure 11:
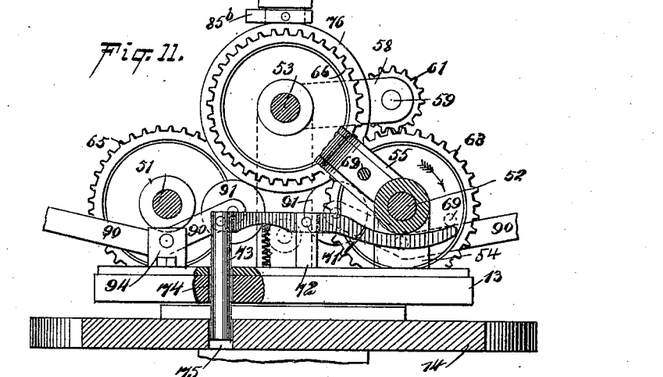
Fig. 11 is a detail sectional view taken through the shafts supporting the gearing and the revolving table, the section being substantially on the line 11 11 of Figs. 1 and 12, the said view being designed particularly to illustrate the locking device for the revolving table.
Figure 12:
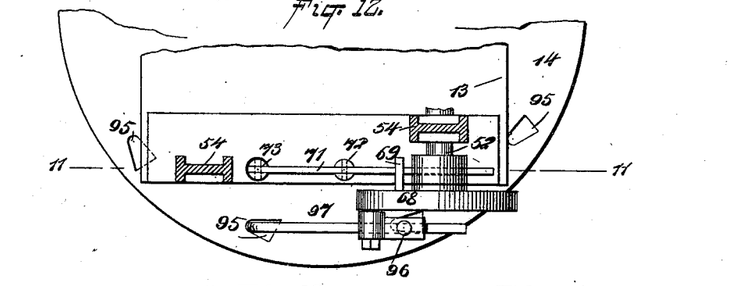
Fig. 12 is a detail view of a portion of the revolving and the fixed tables and a plan view, partly in section, of the locking device for the revolving table shown in Fig. 11.

At the right-hand end of the rear shaft 51 a disk 67 is secured, and at the left-hand end of the forward shaft 52 a like disk 68 is fastened, the latter disk 68 being provided with an inwardly-extending pin 69. This pin, as the disk revolves, engages the curved upper end of a lock-lever 71, which lever is fulcrumed on a support 72, secured to the fixed table, as illustrated in Fig. 11, and carries a pivoted bolt 73, the bolt being held to slide in an opening 74, made in the fixed table, and to enter any one of ten openings which are made in the rotating table 14.

At each revolution of the disk 68 the lever 71 will be freed and the bolt will enter an opening 75 in the revolving table, preventing the said table from turning, and this locking action occurs whenever an arm is brought directly to the front or directly to the rear, and when the revolving table is to be again moved the pin 69 on the disk 68 will be in a position to depress the lock-lever 71 and maintain it in that position until the time arrives for the revolving table to be again locked, which will be after the table has made one-tenth of a revolution.

Figure 13:
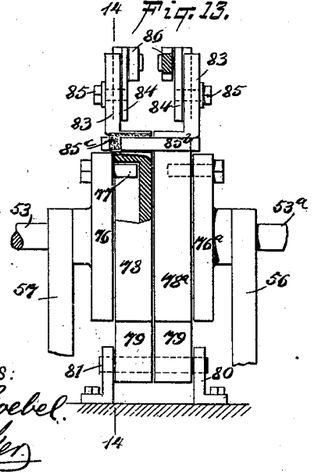
Fig. 13 is an edge view of the cams and disks operating the same, the cams being those which are connected with the arms carrying the soldering devices.
Figure 14:
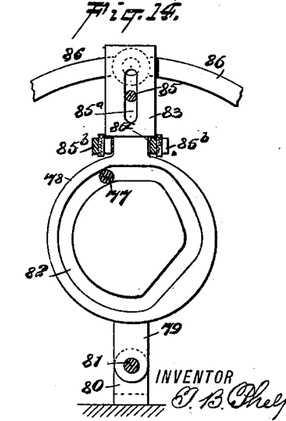
Fig. 14 is a vertical section on the line 14 14 of Fig. 13, showing one of the said cams in side view.

On the inner end of each of the shafts 53 and $53^a$ a disk is secured, the disks being shown best in Fig. 13, wherein they are designated as 76 and $76^a$. Each disk is provided with an inwardly-extending pin 77, and between the two disks 76 and $76^a$ two cams 78 and $78^a$ are mounted to laterally reciprocate, their movements being in opposite directions, as illustrated in dotted lines in Fig. 4. Each cam-disk 78 and $78^a$ at its lower end is provided with a downwardly-extending arm 79, and these arms are pivoted by means of a common pin 81 in brackets 80, secured to the stationary table 13. In the outer face of each cam 78 and $78^a$ a race 82 is produced. One portion of each race is semicircular and the other portion is angular, the side walls of the angular portion of the race converging at a point near the center of the irregular portion, as shown in Fig. 14. The pins 77 of the actuating-disks 76 and $76^a$ enter the races 82 in the cam-disks and impart to the said cam-disks the oscillating movement in opposite directions illustrated in dotted lines in Fig. 4.

An extension 83 is made from the upper portion of each cam-disk, and each extension upon its inner face is provided with a slide-way in which a slide 84 may be vertically adjusted, bolts 85 being carried through suitable openings $85^a$ in the extensions into the slides, as shown in Figs. 13 and 14. Where the disks come together or would contact in their opposite movements, straps $85^b$ or their equivalents are secured, carrying pads $85^c$, as is also shown in Figs. 13 and 14. These pads effectually prevent any undue noise or any jarring while the cams are in action.

An arm 86 is pivotally attached to the upper portion of each slide 84 of each cam-disk. These arms are carried in opposite directions, one in direction of the rear and the other in direction of the front of the machine, being arched at their upper portions, so as to clear the gearing, as illustrated in Fig. 2, their outer ends $86^a$, which extend beyond the two tables, being substantially straight, and at the outer end of each arm 86 a socket 87 is pivoted in a manner enabling the socket to have a free upward movement, and each socket is adapted to receive a soldering-iron 88.

The periphery of each actuating or driving disk is made preferably slightly eccentric, providing a peripheral cam-surface 89, and the cam-surface of each disk is engaged by friction-rollers 91, which rollers are pivoted in the short arms of angular levers 90, the said levers carrying at the outer ends of their longer or straight arms or members friction-rollers 92, which engage with the lower edges of the arms for the soldering-irons, and straps 93, attached to the longer members of the levers, are carried over the carrying-arms for the soldering-irons having sliding movement thereon. The levers 90 at the junction of their members are fulcrumed in suitable supports 94, which are secured to the stationary table 13, as is particularly shown in Figs. 3 and 4.

Figure 4:
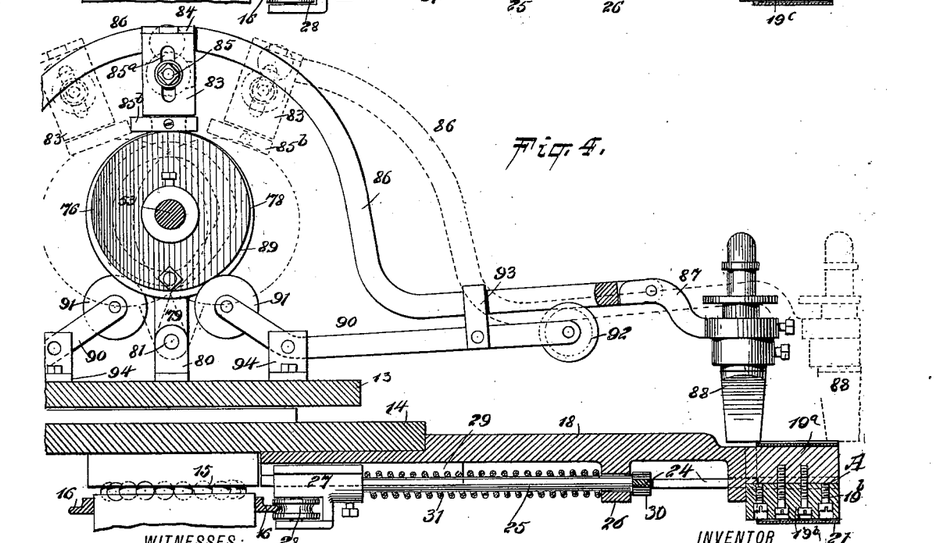

The arms carrying the soldering-irons must have a vertical movement and likewise a lateral movement, the lateral movement being inward and outward. The action of the pins 77 in the cam-races 82 is such that the pins will enter the irregular portion of the races at the moment that the arms at the right of the center in the front and at the left of the center in the back and upon which the can-bodies are placed have reached an exact front and rear central position, and at that time also the friction-rollers 91 on the lift-levers 90 will have engaged with the deeper portion of the cam-periphery of the disks 76 and $76^a$, as shown in Fig. 4, permitting the arms 86, carrying the soldering-irons, to drop. The soldering-irons will then bear upon the overlapping portions of the can-body at their inner ends, and the pins 77 in the cam-races 82 will carry the soldering-irons outward the length of the can-body and back to their first position, at which time the cam-surfaces of the disks 76 and $76^a$ will have acted upon the shorter ends of the lift-levers 90 in a manner to raise the said levers from the can and to the position shown in Fig. 3. The arm at the front, with the soldered can, will now pass in direction of the rear, and the arm at the rear, with the soldered can, will be carried toward the front of the machine one-tenth of the revolution of the revolving table. Just at this time the rollers 43 on the clamping-arm 32 will have entered upon the lower track-face of the lower stationary cam 41, and the clamping-heads of the clamping-arms will be raised. After the elevation of the cam-arm the roller 28, connected with the shifting-bar of that arm, will enter upon a convexed surface of the leaf-cam 16, as shown in Fig. 9, and as the roller 28 travels over this surface the shifting-fork of the shifting-bar is gradually pressed outward until when the arm starting at the front has nearly reached a position at the rear to receive another can-body the soldered can-body carried by it will have been forced from the soldering-mandrel, the same action taking place with reference to the rear arm, on which the can-body was soldered and which is traveling toward the front.

The revolution of the table 14 is accomplished in a simple manner. Ten recesses 95 are made in the revolving table near its periphery, one wall of each recess being straight and the opposing wall inclined. These recesses are placed one opposite each mandrel-carrying arm. A sleeve 96 is pivoted upon the outer face of each disk 67 and 68, attached, respectively, to the shafts 52 and 51, as illustrated in Figs. 1 and 2. In each sleeve a dog 97 is adjustably placed. When the disks 67 and 68 are turned to a position which will impart to the sleeves 96 and the dogs carried thereby a forward movement, the dogs will have entered the most convenient recesses 95 in the table and will move the said table one-tenth of a revolution, and as the disks further revolve the dogs will be removed from the recesses they occupied and carried to the following recesses to again move the table, this movement of the table taking place just after the release of the table from the locking-bolt 74.

Having thus described my invention, I claim as new and desire to secure by Letters Patent—

1. In a can-soldering machine, the combination, with a rotating support, and a mandrel attached to the said support and adapted to receive a can-body, of a driving mechanism, cams oscillated by the said driving mechanism, arms moving with the said cams, and soldering-irons supported by the said arms, adapted to travel from the inner to the outer end of the can-body to be soldered, as and for the purpose set forth.

2. In a can-soldering machine, the combination, with a rotating support and a mandrel attached to the said support and adapted to receive a can-body, of a driving mechanism, cams oscillated by the said driving mechanism, arms moving with the said cams, and soldering-irons supported by the said arms, adapted to travel from the inner to the outer end of the can-body to be soldered, the said arms being in two sections pivotally connected, the sections directly receiving the soldering-irons being capable of an upward movement on the main sections, having, however, a limited downward movement, as and for the purpose specified.

3. In a can-soldering machine, the combination, with a rotating table, a fixed table above the rotating table, and arms attached to the rotating table, each of the said arms being provided with a mandrel adapted to receive a can-body, of driving-gearing located on the fixed table, cams having pivotal support and oscillated from the said driving-gearing, arms operated from the said cams and extending outwardly over the mandrel-carrying arms connected with the revolving table, soldering-irons carried by the cam-actuated arms, and lifting devices, time-operated from the driving-gearing and acting upon the supporting-arms for the soldering-irons, as and for the purpose specified.

4. In a can-soldering machine, the combination, with a rotating table, a fixed table above the rotating table, and arms attached to the rotating table, each of the said arms being provided with a mandrel adapted to receive a can-body, of driving-gearing located on the fixed table, cams having pivotal support and oscillated from the said driving-gearing, arms operated from the said cams and extending outwardly over the mandrel-carrying arms connected with the revolving table, soldering-irons carried by the cam-actuated arms, lifting devices, time-operated from the driving-gearing and acting upon the supporting-arms for the soldering-irons, clamping devices engaging with the mandrels and carried by the rotating arms, and cams actuating the clamping devices, as and for the purpose set forth.

5. In a can-soldering machine, the combination, with a rotating table, a fixed table above the rotating table, and arms attached to the rotating table, each of the said arms being provided with a mandrel adapted to receive a can-body, of driving-gearing located on the fixed table, cams having pivotal support and oscillated from the said driving-gearing, arms operated from the said cams and extending outwardly over the mandrel-carrying arms connected with the revolving table, soldering-irons carried by the cam-actuated arms, lifting devices, time-operated from the driving-gearing and acting upon the supporting-arms for the soldering-irons, clamping devices engaging with the mandrels and carried by the rotating arms, cams actuating the clamping devices, and shifting devices also carried by the mandrel-carrying arms and operating on the can-bodies when the clamping devices are raised, as and for the purpose set forth.

6. In a can-soldering machine, the combination, with a revolving table, a fixed table, arms attached to the revolving table, mandrels carried by the said arms, adapted to support can-bodies, a clamping and a shifting device carried by each of the said arms, and stationary cams from which the said devices are operated, the shifting devices being brought into action when the clamping devices are carried out of clamping engagement with the mandrels, of gearing located on the fixed table, soldering-irons located at predetermined points in the travel of the mandrel-carrying arms, and means for oscillating the supports for the said soldering-irons from the aforesaid driving-gearing, as and for the purpose specified.

7. In a can-soldering machine, the combination, with a revolving table, a fixed table, arms attached to the revolving table, mandrels carried by the said arms, adapted to support can-bodies, a clamping and a shifting device carried by each of the said arms, and stationary cams from which the said devices are operated, the shifting devices being brought into action when the clamping devices are carried out of clamping engagement with the mandrels, of gearing located on the fixed table, soldering-irons located at predetermined points in the travel of the mandrel-carrying arms, means for oscillating the supports for the said soldering-irons from the aforesaid driving-gearing, and lifting-levers, said levers being in sliding engagement with the supports for the soldering-irons, the said lifting-levers being operated by the aforesaid driving-gearing in a manner to raise the supports for the soldering-irons, when at the limit of their inward travel, dropping the said soldering-irons to an engagement with the mandrels beneath them as the mandrels are presented to the said irons, as and for the purpose set forth.

8. In a soldering-machine, the combination, with a mandrel, a rotary support for the same, a fixed table, and driving-gearing located on the said table, of arms oscillated by the said gearing, each arm having a pivotal extension capable of upward movement but restricted against downward movement, and soldering-irons located in the extensions of the said arms, substantially as shown and described.

9. In a soldering-machine, the combination, with a mandrel, a rotary support for the same, a fixed table, and driving-gearing located on the said table, of arms oscillated by the said gearing, each arm having a pivotal extension capable of upward movement but restricted against downward movement, soldering-irons located in the extensions of the said arms, means for vertically adjusting the said arms, and lift-levers likewise operated from the driving-gearing and acting to raise and lower the arms carrying the soldering-irons at predetermined periods, substantially as shown and described.

10. In a soldering-machine, the combination, with a mandrel, a rotary support for the same, a fixed table, and driving-gearing located on the said table, of arms oscillated by the said gearing, each arm having a pivotal extension, capable of upward movement but restricted against downward movement, soldering-irons located in the extensions of the said arms, means for vertically adjusting the said arms, lift-levers likewise operated from the driving-gearing and acting to raise and lower the arms carrying the soldering-irons at predetermined periods, and cushions carried by the reciprocating devices for the supporting-arms of the soldering-irons, the said cushions being adapted to contact when the reciprocating devices are brought together, the said devices having movements in opposite directions, as and for the purpose specified.

11. In a can-soldering machine, a rotating table, mandrels for the reception of the material to be soldered and carried by the said table, a fixed table, and driving-gearing carried by the said fixed table, of a lever-operated latch, the lever being fulcrumed upon the fixed table and operated from the gearing carried thereby at predetermined intervals, the latch being arranged to enter, at predetermined periods, openings in the revolving table, as and for the purpose specified.

12. In a can-soldering machine, a fixed table, a revolving table, the revolving table carrying mandrels for the reception of the material to be soldered, the said revolving table being provided with openings placed at predetermined intervals apart, disks actuated by the said driving-gearing, sleeves pivoted on the said disks, and dogs carried by the said sleeves, arranged to enter the openings in the revolving table for the purpose of revolving the same at desired intervals, as and for the purpose specified.

13. In a can-soldering machine, the combination with a stationary column, of two cams fixed on the column, a table loose on the column, a second table fixed on the column and located above the loose table, a can-mandrel carried by the loose table, a can-shifting device moving with the movable table and driven by one of the cams, a soldering-iron carried by the fixed table, gearing on the fixed table whereby the soldering-iron is operated, means for turning the loose table, said means being driven by the gearing of the fixed table, and a can-clamping device coacting with the mandrel and actuated by the remaining cam, substantially as described.

14. In a can-soldering machine, the combination with a column of two tables thereon, one table being loose and one table fixed on the column, two cams carried by the column, gearing on the fixed table, a soldering-iron operated by the gearing, a mandrel carried by the loose table, a shifting device also carried by the loose table and actuated by one of the cams, and a can-clamp serving to hold the can on the mandrel and operated by the remaining cam, substantially as described.

15. In a can-soldering machine, the combination of a revoluble table, a can-mandrel moving with the table and having longitudinal side grooves, a shifting-fork, the arms of which slide in the grooves, a rod connected to the shifting-fork, a stationary cam sliding the rod, a lever carried by the table, a clamp connected with the lever and coacting with the mandrel to hold the can, and a second stationary cam actuating the said lever, substantially as described.

16. In a can-soldering machine, the combination of a rotary table, an arm outwardly running from said table, a can-mandrel carried by the arm and having longitudinal side grooves, a fork, the arms of which run in the said grooves, a rod connected to the fork, a stationary cam around which the rod travels to actuate the shifting-fork, a bent lever fulcrumed on the arm, a portion of said lever running transversely to the arm, a clamp carried by the arm, a roller on the transverse portion of the lever, the axis of the roller being transverse to said transverse portion, and a stationary cam along which said roller runs, substantially as described.

17. In a can-soldering machine, the combination of a column, two cams fixed on the column, a table loose on the column, a second table fixed to the column, a plurality of arms running radially from the loose table, a can-mandrel carried by each arm, a lever fulcrumed on each arm, a clamp carried by each lever, a roller on each lever, the roller running around one of the cams whereby to actuate the levers, gearing on the stationary table, a soldering-iron operated by the gearing and coacting with the mandrels, and a shifting device actuated by the remaining cam, substantially as described.

18. The combination with a support, of a mandrel mounted to turn around said support, a stationary table on said support, a shaft revolubly mounted on the table, an eccentric disk fixed to the shaft, a pin projecting from the disk, an oscillating disk face to face with the first-named disk and having an eccentric groove receiving the pin of the said first-named disk whereby the oscillating disk is actuated, an arm pivoted to the oscillating disk, a soldering-tool carried by said arm, and a lever fulcrumed on the fixed table and actuated by the eccentric disk, substantially as described.

19. In a can-soldering machine, the combination of a supported mandrel, a table located adjacent to the mandrel, a rotary shaft on the table, an eccentric disk fixed to the shaft, a pin projecting from the shaft, an oscillating disk mounted on the table and having an eccentric groove receiving the pin of the eccentric disk, an arm pivoted to the oscillating disk, a soldering-tool carried by the arm, and a lever fulcrumed on the table and engaging the arm to lift the same, the lever being actuated by the eccentric disk, substantially as described.

20. In a can-soldering machine, the combination with a support, of a rotary shaft, an eccentric disk fixed to the shaft, a pin projecting from one face of the eccentric disk, an oscillating disk with an eccentric groove receiving the pin, an arm pivoted to the oscillating disk, a soldering-tool carried by the arm, and a lever fulcrumed on the support and engaging the arm to lift the same, the lever being actuated by the eccentric disk, substantially as described.

21. In a can-soldering machine, the combination with a support, of an eccentric disk revolubly mounted thereon, a pin projecting from the disk, a member mounted to oscillate on the support and having an eccentric groove on which the pin runs whereby to actuate said oscillating member, an arm pivoted to the oscillating member, a soldering-iron carried by the arm and a lever fulcrumed to the support and engaging the arm to raise the arm, the lever being actuated by the eccentric disk, substantially as described.

22. In a can-soldering machine, the combination with a support, of an eccentric and revolubly-mounted disk, an oscillating member on said support, said member being actuated by the revolving eccentric disk, an arm pivoted to said oscillating member, a soldering-iron carried by the arm and a lever fulcrumed on the support and engaging the arm to lift the same, the lever being actuated by the eccentric disk, substantially as described.

23. In a can-soldering machine, the combination with a support, of two eccentric disks revolubly mounted on the support, a pin projecting from each disk, two oscillating members carried by the table and located between the disks, each member having an eccentric groove respectively receiving the pins whereby said oscillating members are actuated, an arm pivoted to each oscillating member, a stop carried by each oscillating member and limiting the movement of said members, a soldering-iron carried by each arm, and two levers fulcrumed on the support, the levers respectively engaging the arms to lift the same, and being respectively actuated by the eccentric disks, substantially as described.

24. In a can-soldering machine, the combination with a support, of a revoluble table on the support, a fixed table on the support, gearing on the fixed table, means for turning the loose table from said gearing, a lever fulcrumed on the fixed table and periodically actuated by the gearing, and a bolt connected to the lever and serving to periodically lock and release the movable table, substantially as described.

25. In a can-soldering machine, the combination with a support, of a movable table carried by the support, a fixed table carried by the support, means for moving the movable table, such means being carried on the fixed table, a lever fulcrumed to the fixed table, a bolt carried by the lever and serving to lock and release the movable table, a rotary shaft on the movable table, a wheel carried by said shaft, and a pin projecting from the wheel and actuating the lever, substantially as described.

26. In a can-soldering machine, the combination with a support, of a loose table on the support, a fixed table on the support, a rotary shaft on the fixed table, a wheel fixed to the shaft, a sleeve pivoted to the wheel and a hooked rod adjustably held in the sleeve and engaging the movable table to turn the same, substantially as described.

27. In a can-soldering machine, the combination with a support, of a fixed and a movable table, a rotary shaft on the fixed table, and a rod pivotally connected with the shaft and moved back and forth thereby, whereby to impart an intermittent movement to the movable table, substantially as described.

28. A can-soldering machine having a column, a movable table on the column, a fixed table on the column, a mandrel carried by the movable table, means for turning the movable table, and a soldering-iron carried by and operated from the fixed table, substantially as described.

29. A can-soldering machine having a column, a table turning on the column, a mandrel carried by the table, a fixed table carried by the support, and a soldering-iron carried by and actuated from the fixed table, substantially as described.

30. A can-soldering machine having a column, a table turning on the column, a plurality of mandrels moving with said table, a fixed table carried by the column, two soldering-irons held by the fixed table, and means on the fixed table for moving said irons toward and from each other, and radially with reference to the axis to the moving table, substantially as described.

31. A can-soldering machine having a column, a table turning on the column, a table fixed to the column, two cams fixed to the column, a mandrel carried by the turning table, a clamp also carried by the turning table and coacting with the mandrel, the clamp being actuated by one of the cams, a shifting device carried by the table and operated by the remaining cams, a soldering-iron supported by the fixed table, and means for reciprocating said iron radially with reference to the axis of the moving table, substantially as described.

THEODORE B. PHELPS.

Witnesses:
JOHN S. ENO,
P. T. CORNELL.